UNITED STATES PATENT OFFICE.

ARNO BEHR, OF CHICAGO, ILLINOIS.

PROCESS OF MANUFACTURING STARCH.

SPECIFICATION forming part of Letters Patent No. 406,559, dated July 9, 1889.

Application filed July 19, 1888. Serial No. 280,433. (No specimens.)

*To all whom it may concern:*

Be it known that I, ARNO BEHR, of Chicago, Illinois, have invented an Improved Process of Manufacturing Starch, of which the following is a specification.

The object of this invention is the production by what is known as the "acid process" of a purer starch than that heretofore made by that process, to the end that the product may be adapted for manufacture into a particularly pure grade of glucose—such as confectioner's glucose—while of course it may also be used for manufacture into corn-starch and into laundry-starch.

The process of manufacturing refined starch which forms the subject of the invention is carried out in the following-described manner: First, the whole grain is soaked in a weak aqueous solution of sulphurous or other acid for, say, ten or fifteen days, or until the mealy part of the grain is softened and the germs lose their naturally brittle character and become tough and leathery, so that they are not easily broken during the operation of crushing the grain; secondly, the grain is crushed and mixed with water, and the starch-milk, after the separation therefrom of the germs and hulls, is run over the ordinary starch-tables; thirdly, the starch is collected from the starch-tables and stirred into a sufficient quantity of water to form a starch-milk of, say, 20° Baumé, to which is then added an alkali—such as caustic soda—the quantity added being such that the mixture will show from 0.2 to 0.3 per cent. of free caustic soda, ($Na_2O$;) fourthly, after the caustic soda has been allowed to act for about twenty-four hours the resulting alkalied starch-milk is introduced into the imperforate drum of a centrifugal separator and the starch is separated from the gluten present by centrifugal force.

The alkalied starch-milk is introduced into the drum while the machine is stationary, and the drum is then rotated at a prescribed speed and for a suitable length of time, until the clean starch has formed a wall around the concave inner surface of the drum, while the gluten present remains in suspension or a portion thereof has been deposited upon the concave surface of the starch-wall. The circular wall of the drum is provided with vertical partitions extending inwardly therefrom a few inches, and thus forming receptacles, the contents of which do not communicate with each other when the machine is in motion. In the bottom of the drum is a hole closed with a removable plug or valve. In these, as in all other respects, however, the construction of the centrifugal separator is not new, and therefore does not need description in detail.

It will be found that with a drum thirty inches in diameter, charged while at rest with the alkalied starch-milk and then rotated at a speed of about eight hundred revolutions per minute, there will be an effective separation of the starch from the gluten and a settling of the clean starch against the concave wall of the drum in rather less than three minutes. The machine is then brought to rest and its liquid contents are discharged by removing the plug or opening the valve in the bottom of the drum. If any gluten has become deposited upon the surface of the starch-wall, it is washed off by projecting jets of water against the said wall. This is easily done by means of a rose-nozzle connected to a flexible tube supplied with water under pressure. The washing-water and gluten are discharged through the hole in the bottom of the drum. The clean starch is then dug out of the drum, mixed with water, allowed to settle, and the superincumbent liquid drawn off. By this process of settlement and decantation the alkali is washed out of the starch, which may then be used in its wet state for the production of a fine quality of glucose or sugar, or may be dried and worked up into the various forms of commercial starch.

What is claimed as the invention is—

The herein-described method of producing refined starch by the acid process, embracing the following steps, to wit: the preliminary soaking of the whole grain in a weak acid solution, the crushing of the grain and its mixture with water, the separation of the germs and hulls from the starch-milk, the running of the starch-milk over starch-tables, the collection of the starch from the starch-tables and its mixture with a sufficient quantity of water to form a starch-milk of, say, 20° Baumé, the treatment of such starch-milk with an alkali—such as caustic soda—the introduction of the resulting alkalied starch-milk into the drum of a centrifugal separator and the separation of the starch from the gluten by centrifugal force, the removal by washing of any gluten deposited upon the surface of the starch-wall and the draining of the water and gluten from the drum, and, finally, the mixture of the starch collected from the drum with water and the washing out and elimination of the alkali by settlement and decantation, as set forth.

ARNO BEHR.

Witnesses:
CHAS. J. ROE,
A. H. HAWKES.